(12) United States Patent
Van Randen (10) Patent No.: US 8,826,630 B2
(45) Date of Patent: Sep. 9, 2014

(54) METHOD AND SYSTEM FOR INVISIBLY ARRANGING CABLING IN A ROOM

(71) Applicant: Infill Systems B.V., Delft (NL)

(72) Inventor: Age Van Randen, Hilversum (NL)

(73) Assignee: Infill Systems B.V., Delft (NL)

( * ) Notice: Subject to any disclaimer, the term of this patent is extended or adjusted under 35 U.S.C. 154(b) by 0 days.

(21) Appl. No.: 14/217,987

(22) Filed: Mar. 18, 2014

(65) Prior Publication Data

US 2014/0196389 A1  Jul. 17, 2014

Related U.S. Application Data

(63) Continuation of application No. 12/594,580, filed as application No. PCT/NL2008/000099 on Apr. 4, 2008, now Pat. No. 8,713,893.

(30) Foreign Application Priority Data

Apr. 4, 2007  (NL) ..................................... 1033640

(51) Int. Cl.
*H02G 3/22* (2006.01)
*E04C 2/52* (2006.01)
(52) U.S. Cl.
CPC ..................................... *E04C 2/521* (2013.01)
USPC ........... 52/745.21; 52/220.7; 52/239; 52/242; 174/495
(58) Field of Classification Search
USPC .......... 52/220.7, 239, 242, 36.1, 290, 745.21; 174/FOR. 107, 495
See application file for complete search history.

(56) References Cited

U.S. PATENT DOCUMENTS

| | | | | |
|---|---|---|---|---|
| 4,360,705 A | * | 11/1982 | Rogers .......................... | 174/492 |
| RE31,733 E | * | 11/1984 | Haworth et al. ................ | 439/31 |
| 4,800,696 A | * | 1/1989 | Miller et al. ................... | 174/495 |
| 5,905,229 A | * | 5/1999 | McKitrick et al. ............. | 174/495 |
| 6,591,563 B2 | * | 7/2003 | King et al. ....................... | 52/243 |

* cited by examiner

*Primary Examiner* — William Gilbert
(74) *Attorney, Agent, or Firm* — Knobbe Martens Olson & Bear LLP (57) ABSTRACT

The invention relates to a method with which cabling can be arranged invisibly in an indoor space in rapid and simple manner. This method comprises the steps of placing a non-load-bearing partition wall which has a cavity and which is provided on its underside with a recess which extends over the whole length thereof and which is at least partially open on its upper side and communicates with the cavity, and placing the laid cabling laterally into the recess. The method further comprises of arranging at least one take-off point in the partition wall, leading a take-off cable from the take-off point through the cavity in the partition wall to the recess, and connecting the take-off cable to the cabling in the recess. In the case of walls provided with studs or other connecting elements, these can, at the position of the recess, be replaced by or strengthened with strengthening elements leaving the recess at least partially clear. Different embodiments of these strengthening elements can be applied. The invention further relates to a system with which this method can be performed, and to different components of the system.

25 Claims, 10 Drawing Sheets

METHOD AND SYSTEM FOR INVISIBLY ARRANGING CABLING IN A ROOM

The invention relates to a method for invisibly arranging cabling in an indoor space defined wholly or partially by non-load-bearing partition walls.

More and more cabling is to be found in modern buildings. In addition to electric lines, often for both high-voltage current and low-voltage current, office spaces as well as dwellings are being provided to an increasing extent with data cables.

In conventional building this cabling, when the floor and/or walls are cast—prefabricated or on site—from concrete, is often accommodated in tubes placed in the shuttering prior to pouring. In addition, it is known to cut cable channels in brick walls after erection thereof, these channels being once again filled and finished after arranging of the cabling. These conventional methods for invisible arrangement of cabling have in common that they are relatively labour-intensive, and thus entail high installation costs.

Further known in system building is the use of special floor tiles in which recesses are already formed during production for the purpose of receiving cabling. For cabling which must be led to sockets in a partition wall use has heretofore usually been made in system building of box skirting in which cable ducts are arranged and which are placed along the wall. The sockets are then also arranged in this skirting. This latter method does not in fact involve invisible placing of the cabling, since such box skirting is generally relatively voluminous and conspicuous. Furthermore, the placing of the sockets in the skirting is not usually practical with a view to the accessibility thereof.

The invention now has for its object to provide a method for invisibly arranging cabling in an indoor space, wherein said drawbacks do not occur, or at least do so to lesser extent. According to the invention this is achieved in such a method by the steps of:

placing at least one non-load-bearing partition wall which has a cavity and which is provided on or close to its underside with a recess which extends substantially over the whole length thereof and which is at least partially open on its upper side and communicates with the cavity, placing the laid cabling laterally into the recess, arranging at least one take-off point in the partition wall, leading a take-off cable from the take-off point through the cavity in the partition wall to the recess, and connecting the take-off cable to the cabling in the recess.

Wall systems are per se already known wherein a recess is formed on the underside for receiving cabling, but here this recess is not freely accessible along its whole length as a result of the presence of uprights or studs. When such wall systems are applied, the cabling must therefore must be threaded as a whole into the recess, or the cabling must be placed per segment in the recess, after which these segments must be coupled by means of plug connections. These are both laborious and time-consuming procedures, all the more so as it is necessary to work at floor level, this being an unhealthy posture while working.

In addition, wall systems are also known wherein a continuous recess is formed on the underside, for instance in that the wall rests on an I-beam. In these systems the recess is not however accessible from the wall, so that sockets must necessarily be mounted on the I-beam.

By now making use of a wall which is provided with a continuous recess the cabling can be integrally prepared, for instance by connecting cable segments, before it is placed in the recess. Preparation can then be carried out at a normal working height and in a healthy working posture, optionally even at another location. By additionally giving the recess an at least partially open form on its upper side, wall sockets can be mounted at any random position on the wall, after which the cabling can be carried downward from the wall sockets through the wall to the open upper side of the recess, and can then be connected to the cabling present therein.

In order to enable accommodation of cables separately of each other at different levels in the recess, means are preferably arranged in the recess at a distance above a floor of the room for the purpose of supporting and/or fixing cabling, and at least a part of the cabling is placed in these support and/or fixation means. For optimum guiding of the cabling the support and/or fixation means can be arranged at regular intervals in the recess.

Wall systems are known wherein the wall is assembled from studs with panelling on either side between which the cavity is formed. In this case each stud is preferably replaced or strengthened, at the position of the recess, by a strengthening element leaving the recess at least partially clear in order to support the wall at this position, and to ensure the stability of the wall without the recess having to be interrupted.

In other known wall systems the wall is constructed from a number of mutually connected panels. In such walls it is recommended to arrange at the position of each connection between adjoining panels a strengthening element leaving the recess at least partially clear, once again with a view to supporting and stabilizing the wall without detracting from the continuous nature of the recess.

When in these cases the wall is placed on the floor of the room and one or more profiles are fixed to the floor at the position of the wall, in or against which profiles the underside of the wall is placed, it is recommended that the or each strengthening element is placed fittingly in the profile and/or is connected thereto. The wall is thus positioned and fixed in reliable manner.

A simple and effective construction, which can be rapidly placed, is achieved when the support and/or fixation means are connected to the strengthening elements or integrated therein.

In order to conceal the cabling from view the recess is advantageously covered after arranging of the cabling therein. This can be achieved in simple manner by placing one or more skirting elements in front of the recess.

When strengthening elements are incorporated in the recess, a rapid and reliable assembly is achieved when the or each skirting element is fixed to at least one strengthening element.

It is possible to envisage a door opening being incorporated in the partition wall. In this case a recess connected to the recess in the wall is preferably formed in the floor of the room at the position of the door opening in order to there also conceal the cabling invisibly. For a good guiding of the cabling, which is then laid in the wall above the floor and at the door opening under the floor, a transition element can then be arranged between the recess in the wall and the recess in the floor.

The invention further relates to a system for invisibly arranging cabling in an indoor space which can be applied in performing the above described method. According to the invention such a system comprises at least one non-load-bearing partition wall which has a cavity and which is provided at or close to its underside with a recess which extends substantially along the whole length thereof and which is at least partially open on its upper side and communicates with the cavity. As elucidated above, the cabling can hereby be laid along the recess and then carried laterally into the recess. Furthermore, wall sockets can thus be fitted at random locations on the wall, after which the associated cabling can be guided through the wall to the open upper side of the recess in order to be connected to the cabling.

When the wall is assembled from studs with panelling on either side between which the cavity is formed, and each stud is replaced or strengthened at the position of the recess by a strengthening element leaving the recess at least partially clear, each stud preferably has a hollow cross-section and the strengthening element is inserted on the underside into the hollow stud. A reliable connection is thus formed in simple manner between each stud and the associated strengthening element.

When the strengthening element extends substantially over the whole depth of the recess and is provided with a secondary recess, an optimum strengthening is obtained while the recess can nevertheless run continuously.

The strengthening element can herein take a solid form, for instance of wood or recycled rubber. When the strengthening element is a profiled plastic part, it can be manufactured in large quantities at relatively low cost, for instance by injection moulding or pressing. For heavy loads this plastic part can optionally be further provided with one or more additional stiffeners, for instance of hardwood.

Another option in this respect is that the studs and strengthening elements each have a U-shaped or C-shaped section and are connected to each other in opposing directions, thus forming a closed section in which the secondary recess is formed. Such a connection can be readily applied in a so-called metal stud wall, the studs of which usually take a U-shaped or C-shaped form.

Finally, it is also possible, particularly when the studs are solid, for each strengthening element to be formed integrally with the underside of the stud, in which the secondary recess is then formed.

When the wall is constructed from a number of mutually connected panels, and a strengthening element leaving the recess at least partially clear is arranged at the position of each connection between adjoining panels, a space is usually defined in each case between adjoining panels for receiving one or more connecting elements. In this case a simple and reliable connection is formed when a part of the strengthening element protrudes into this space.

Conversely, it is possible in the case of a wall consisting of panels, wherein at least one connecting element is arranged in each case between adjoining panels, to arrive at a simple and reliable connection when the strengthening element is fixed to the at least one connecting element.

In both cases the strengthening element can once again extend substantially over the whole depth of the recess and can be provided with a secondary recess.

When the support and/or fixation means are connected to the strengthening elements or integrated therein, they can advantageously comprise in each case at least one hook protruding from the strengthening element into the recess. A part of the cabling can then come to lie on this hook or these hooks so that it is held at a distance from the cabling lying on the floor. A physical separation can thus be obtained between for instance high-voltage current cables on the one hand and low-voltage current cables and/or data cables on the other.

As stated above, the skirting elements used to conceal the recess and the cabling laid therein from view can be fixed to the strengthening elements. In this case the skirting fixing means comprise in each case at least one tongue protruding from the strengthening element to a position outside the recess. This tongue can be formed integrally with the hook of the support and/or fixation means, whereby the number of separate components of the system is reduced.

The system according to the invention can further be provided with means for height adjustment of the skirting elements. When a covering floor is of varying thickness, the same skirting elements can hereby still be used to cover the recess in the wall. A solution which is structurally simple and simple to use is then obtained when these height adjusting means comprise eccentrically mounted engaging elements connected pivotally to each skirting element.

As stated above, a door opening can be incorporated in the partition wall, and a recess connected to the recess in the wall can be formed in the floor of the room at the position of the door opening, wherein a transition element can be arranged between the recess in the wall and the recess in the floor. In this case the transition element preferably has a first channel part fitting in the recess in the wall and open to the top, a second channel part fitting in the recess in the floor and open to the bottom and an inclining transition part arranged therebetween. This ensures a simple infeed of the cabling and a good guiding thereof at the position of the transition.

When the transition element has means for supporting a frame bounding the door opening, a stable fixing of the frame can be achieved despite the presence of the recess under the door opening. In the case the wall is assembled from studs with panelling on either side, the frame support means can then support an end stud of the wall to which the doorframe is attached.

Finally, the invention further relates to support and/or fixation means, a strengthening element, height adjusting means and a transition element, all evidently intended for use in a system as described above.

The invention is now elucidated on the basis of a number of embodiments, wherein reference is made to the accompanying drawing in which corresponding components are designated with reference numerals increased by "100" at a time, and in which.

Figure 1:
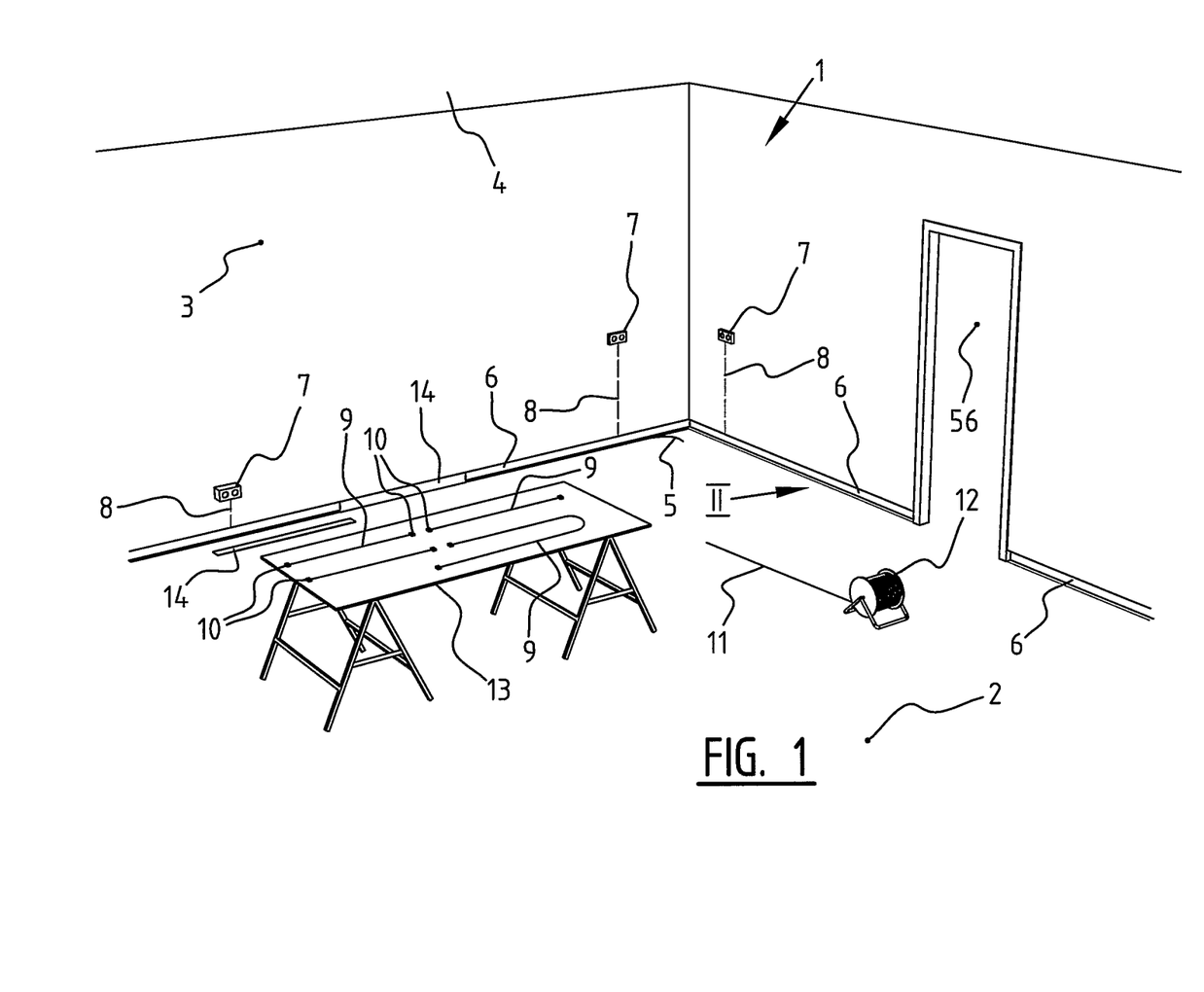
FIG. 1 is a schematic perspective view of a room with a wall in which cabling is invisibly concealed by making use of the method according to the invention.

An indoor space 1 is bounded by a floor 2, a number of non-load-bearing partition walls 3 and a ceiling 4 (FIG. 1). Partition walls 3 form part of a system for invisibly arranging cabling 5 in room 1, and are each provided for this purpose on or close to their underside with a recess 6 extending substantially over the full length of the relevant wall 3. Depending on the construction of partition walls 3, these recesses 6 are wholly or partially open on their top side and communicate with one or more cavities 8 formed in walls 3. Arranged at different locations in or on walls 3 are wall sockets 7 which are connected to recess 6 by means of the—here channel-like—cavities 8 (shown schematically with broken lines). In these channels 8 can be arranged wiring which can be connected to cabling 5 arranged in recess 6.

Cabling 5 can first be laid adjacently of recess 6, for instance by interconnecting different cable segments 9 using plugs 10, or simply by unrolling a continuous cable 11 from a reel 12. If desired, these operations can be performed at an appropriate working height, for instance by making use of a work table 13. The preparatory work can also be performed at another location, for instance at a special workplace, after which the cabling, ready for installation, can be taken to the relevant indoor space 1. Once cabling 5 has been laid adjacently of recess 6, it can be pushed in simple manner laterally into recess 6. Recess 6 can then be covered, for instance by placing skirting element 14 thereover.

Support and/or fixation means 15 can be arranged at regular intervals some distance above floor 2 in each recess 6, on which means a part of cabling 5 can be laid in order to thus form two separate levels of cabling, for instance for high-voltage current on the one hand and low-voltage current and data on the other. These support and/or fixation means 15 can be attached to, or even formed integrally with, strengthening elements 16 which are discussed in more detail hereinbelow. These strengthening elements 16 can also serve for fixing of skirting elements 14, as will be elucidated below.

Partition walls 3 can for instance be so-called metal stud walls. These walls consist of two layers of plasterboards 17F, 17R which are fixed on both sides to metal studs 18 (FIG. 2) and between which a layer of insulating material 19 can be received. The thickness of this layer 19 is here smaller than the distance between plasterboards 17F, 17R, so that a cavity 8 is formed in partition wall 3 over its whole area. Studs 18, which usually have a C-shaped profile, are normally accommodated on their underside in a U-shaped profile 20 which is attached to floor 2 and which is open to the top.

Figure 2:
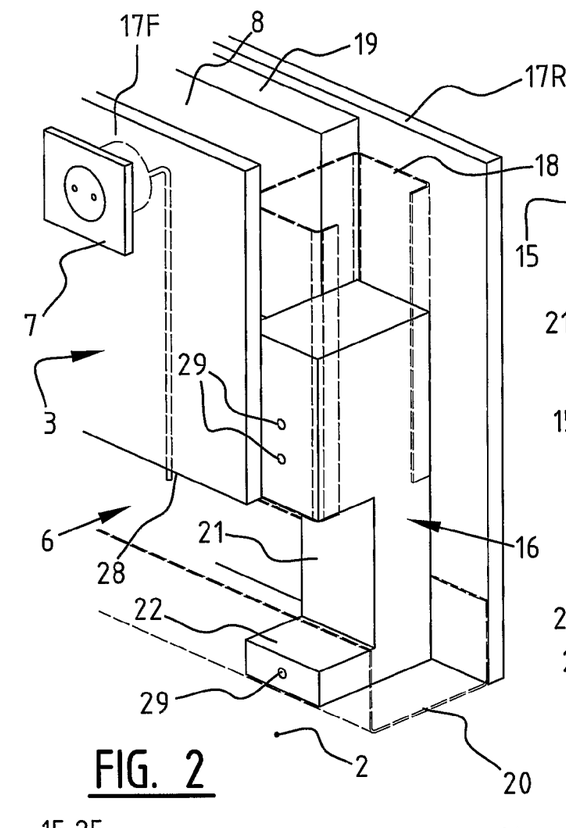
FIG. 2 is a perspective detail view according to arrow II in FIG. 1 when the wall is provided with studs and strengthening elements.

In the system according to the present invention the plasterboards 17F on the front side of wall 3 are shorter than plasterboards 17R on the rear side, whereby a recess 6 is thus formed at the bottom of wall 3. This recess 6 is open on its upper side and communicates with cavity 8 in wall 3, so that at any random point on wall 3 can be arranged a wall socket 7, the cabling of which can be guided to recess 6 and there connected to cabling 5. Studs 18 have the same length as the front plasterboards 17F, and therefore no longer extend into profile 20. Arranged at the position of studs 18 are strengthening elements 16, which are connected to studs 18.

In the shown embodiment each strengthening element 16 takes a solid form, for instance of wood or a plastic such as recycled rubber, and is received in the underside of stud 18 which has an open or hollow section. The underside of strengthening element 16 rests in profile 20 on floor 2. A—secondary—recess 21 is of course also formed in strengthening element 16 in order to ensure the continuous character of recess 6 in wall 3. Strengthening element 16 can be fixed, for instance with screws or nails 29, to both the stud 18 and profile 20, but can also be simply clamped therein. In respect of clamping of strengthening element 16 in stud 18 it must also be taken into account that in a metal stud wall the studs 18 take an asymmetrical form in the sense that one of the legs of the C-shape is slightly longer than the other. The dimensioning of strengthening element 16 must therefore be adapted to the shorter leg so that it can always be clamped into stud 18, irrespective of which leg is attached against the front plasterboard 17F.

Figure 3A:
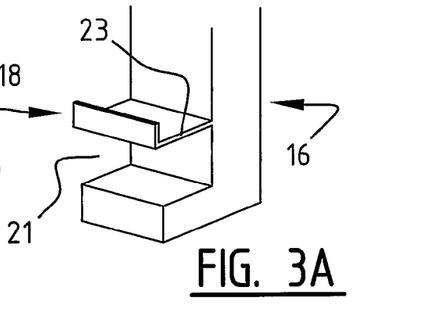
FIGS. 3A to 3E show views corresponding to FIG. 2 of alternative embodiments of the strengthening element shown therein.
Figure 3B:
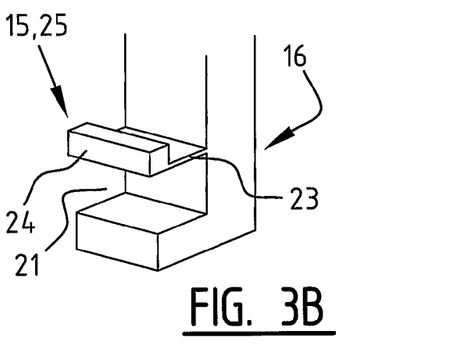
Figures 3C, 3D, 3E:
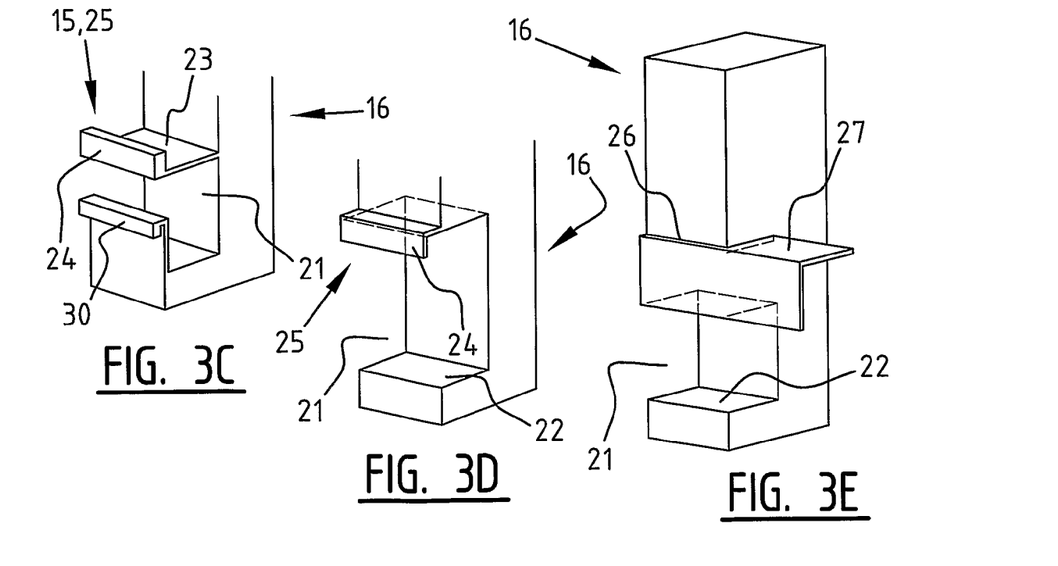

Although in the shown embodiment the cabling 5 can be laid on the lower edge 22 of secondary recess 21, in a variant of this embodiment of strengthening element 16 there are provided integrated support and/or fixation means 15 which are formed by a hook 23 extending into secondary recess 21—and thereby also into recess 6 (FIG. 3A). The outer end of this hook 23 can take the form of a thickened tongue 24, over which the top side of a skirting element 14 can be snapped or to which the skirting element 14 can be screwed (FIG. 3B). Support and/or fixation means 15 thus also form fixing means 25 for skirting elements 14. On the underside of strengthening element 16 a spacer member 30 can optionally then also be arranged with which skirting element 14 can be held at a distance from the U-profile 20 attached to floor 2. Conversely, strengthening element 16 can also be provided with a forward protruding, downward directed tongue 24 behind which a skirting element 14 can be clamped (FIG. 3D), which then supports precisely against U-profile 20 on floor 2. Finally, in yet another variant of this embodiment of strengthening element 16, there is provided a channel 26 in which a profile 27 can be received which extends over the whole length of wall 3 along the lower edge 28 of the front plasterboard 17F, and thus supports this board (FIG. 3E).

Figure 4:
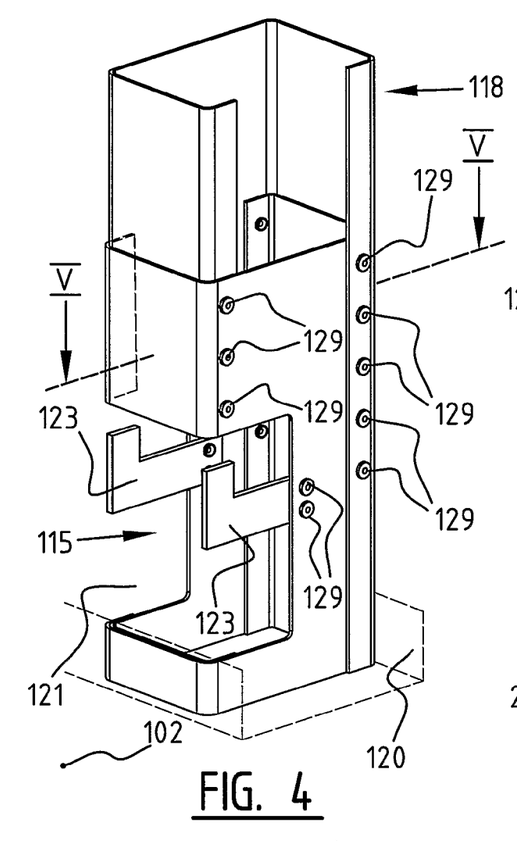
FIG. 4 shows a perspective detail view of another embodiment of the strengthening element for use with a C-shaped stud.
Figure 5:
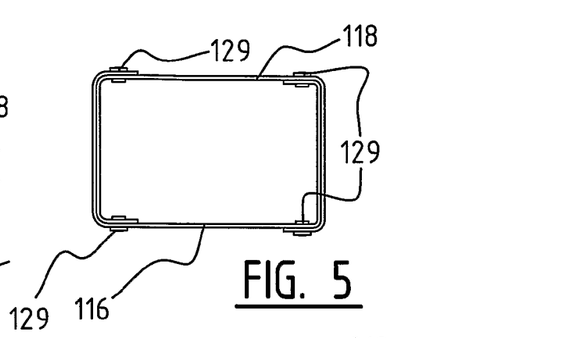
FIG. 5 shows a section along line V-V in FIG. 4.

An alternative embodiment of strengthening element 116 for the metal stud wall is embodied, just as stud 118, in thin-walled material, for instance sheet metal, and has the same asymmetrical C-shaped section as stud 118 (FIG. 4). Strengthening element 116 and stud 118 are in this case slid into each other with their open sides directed toward each other, wherein the short leg of stud 118 is received in the long leg of strengthening element 116, and vice versa, and are fixed to each other by means of for instance pop rivets 129 (FIG. 5). A closed profile is thus created which has considerable strength and rigidity. In this embodiment a cut-away portion, which defines secondary recess 121, is formed in stud 118, which here does extend into floor profile 120, as well as in strengthening element 116. In this secondary recess 121 are fixed two hooks 123 which serve as support and/or fixation means 115 for a part of the cabling.

Figures 20, 21:
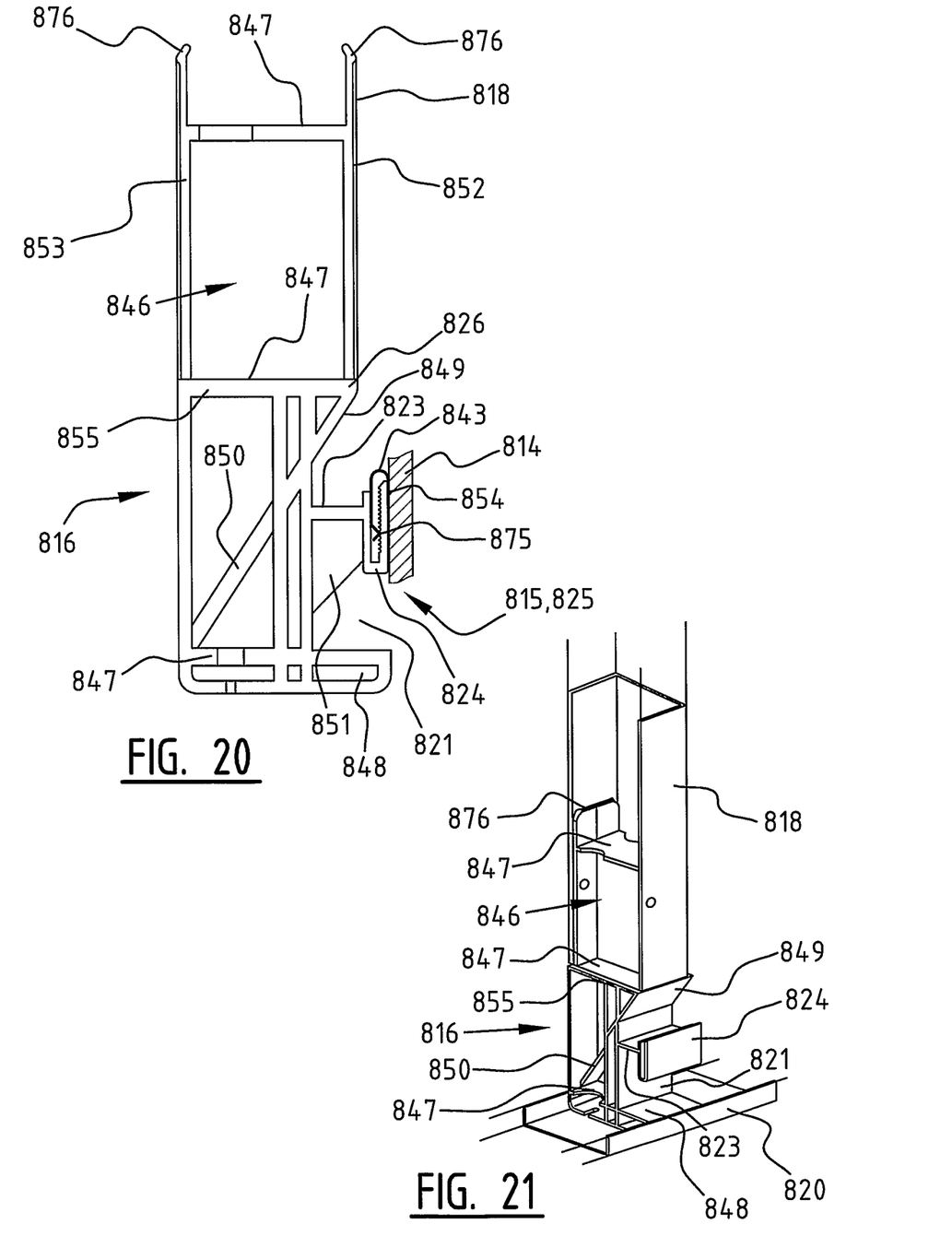
FIG. 20 is a side view of a strengthening element for use with hollow studs, which is formed as an injection moulded part.
FIG. 21 is a perspective view of the strengthening element of FIG. 20 in mounted position.

In yet another variant of this embodiment strengthening element 816 is formed as profile part of plastic (FIG. 20). This profile part can be formed by for instance injection moulding, pressing or other method suitable for large-scale production. Strengthening element 816 here has an I-shaped upright stiffener 846 which extends over the full height and is provided with a number of ribs 847. These ribs 847 have recesses for passage of conduits possibly arranged in the studs of the metal stud wall. Although not shown here, one or more additional stiffeners of a material such as for instance hardwood can be connected to the I-shaped stiffener 846 in applications where high loads are to be expected.

Protruding on the front side of stiffener 846 are a number of profiles which are integrated therewith and which fulfil the different functions discussed above. A box profile 848 is thus co-moulded onto the underside which, together with stiffener 846, can be received close-fittingly in a U-shaped floor profile 820 (FIG. 21). Co-moulded some distance thereabove is a triangular transition profile 849 which, with box profile 848, bounds the secondary recess 821. An inclining rib 850 extends in the line of this transition profile 849. Co-moulded between the two profiles 848, 849 is another tongue 823 with U-shaped outer end 824 which functions as support and/or fixation means 815 and as fixing means 825 for a skirting element 814. A resilient engaging element 843 of for instance spring steel connected to skirting 814 engages in the U-shaped outer end 824. The fixing height of skirting 814 can herein be defined by co-action of a pointed part 875 of engaging element 843 and a ribbing 854 in the U-shaped outer end 824. Channel 826 defined by the central rib 847 and transition profile 849 serves once again to receive an angle section 827 (not shown here) for the purpose of finishing and supporting the lower edge 828 of the front plasterboard 817F (not shown).

The front flange 852 of I-shaped stiffener 846 is otherwise set back slightly relative to the front side of central rib 847, and is moreover also slightly narrower than this rib 847. Similarly, the rear flange 853 of I-shaped stiffener 846 takes a slightly narrower form at the top than at the bottom and is set back slightly. Formed in this manner is a peripheral stop surface 855 which defines how far strengthening element 816 can be pushed into stud 818. The upper ends 876 of flanges 852, 853 here protrude slightly outside the surface thereof so that they are bent inward when element 816 is pushed into stud 818. Strengthening element 816 is thus clamped resiliently in stud 818.

Figure 6:
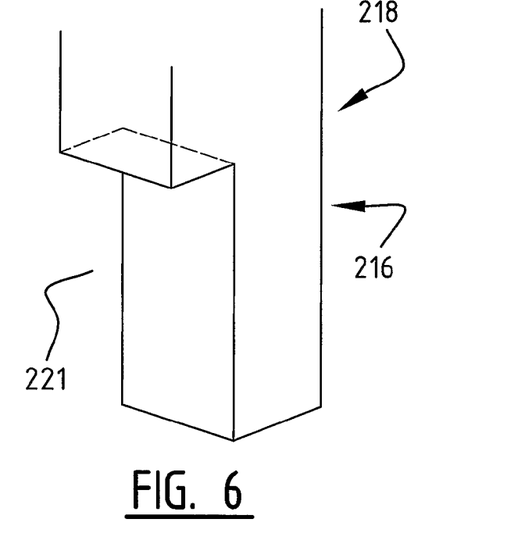
FIG. 6 is a perspective detail view of a stud with a strengthening element integrated therein.
Figure 7A:
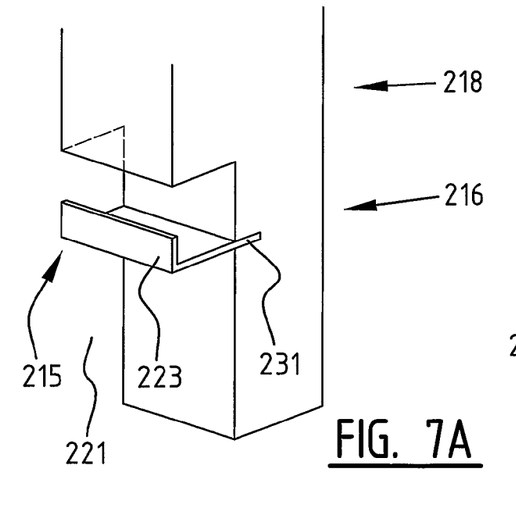
FIGS. 7A and 7B show views corresponding to FIG. 6 of alternative embodiments of the strengthening element shown therein.
Figures 7B, 8B:
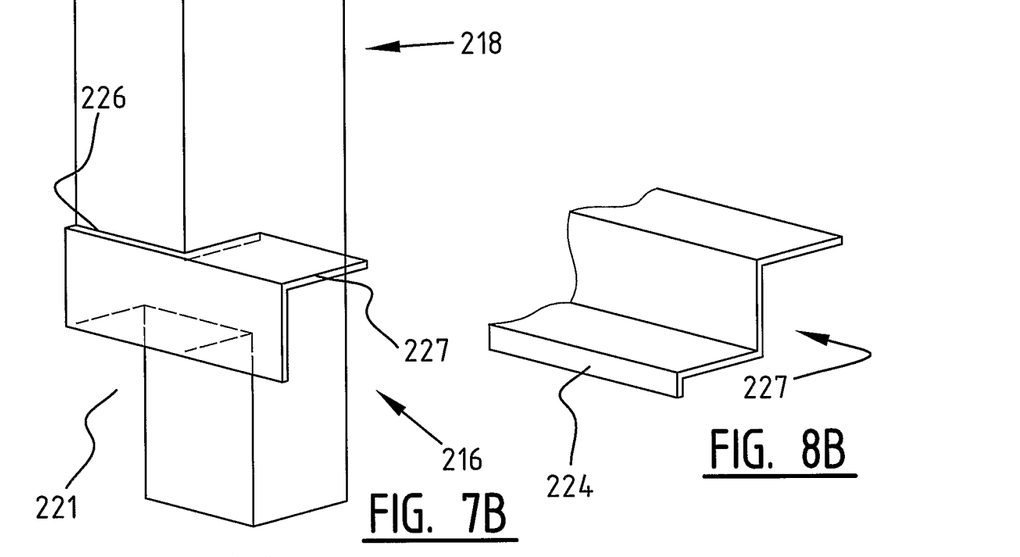
FIGS. 8A and 8B show a perspective detail views of alternative embodiments of the profiles incorporated in the strengthening elements of FIGS. 7A and 7B.
Figure 8A:
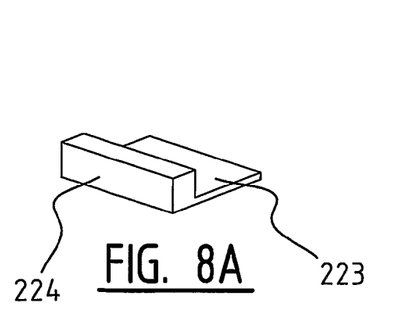

Wall 3 can also be a so-called wood frame plasterboard wall. In this case studs 218 take a solid form in wood and strengthening element 216 is integrated into the underside thereof (FIG. 6). A secondary recess 221 is once again formed in strengthening element 216. In a variant of this embodiment strengthening element 216 is once again provided with support and/or fixation means 215, here in the form of a hook 223 received in a channel 231 (FIG. 7A). As in the case of the metal stud wall, support and/or fixation means 215 could here also serve as fixing means 225 for skirting elements 214. In that case the outer end of hook 223 can again form a thickened tongue 224 over which the top side of a skirting element 214 snaps or to which it can be screwed (FIG. 8A). A channel 226 can again also be formed in strengthening element 216 for the purpose of receiving a continuous profile 227 which supports the lower edge 228 of the front plasterboard 217F (FIG. 7B). These two variants can of course also be combined by providing strengthening element 216 with different channels. In addition, the continuous support profile 227 can take a double-stepped form, whereby it defines a downward directed tongue 224 behind which a skirting element 214 can be fixed (FIG. 8B).

Figure 9:
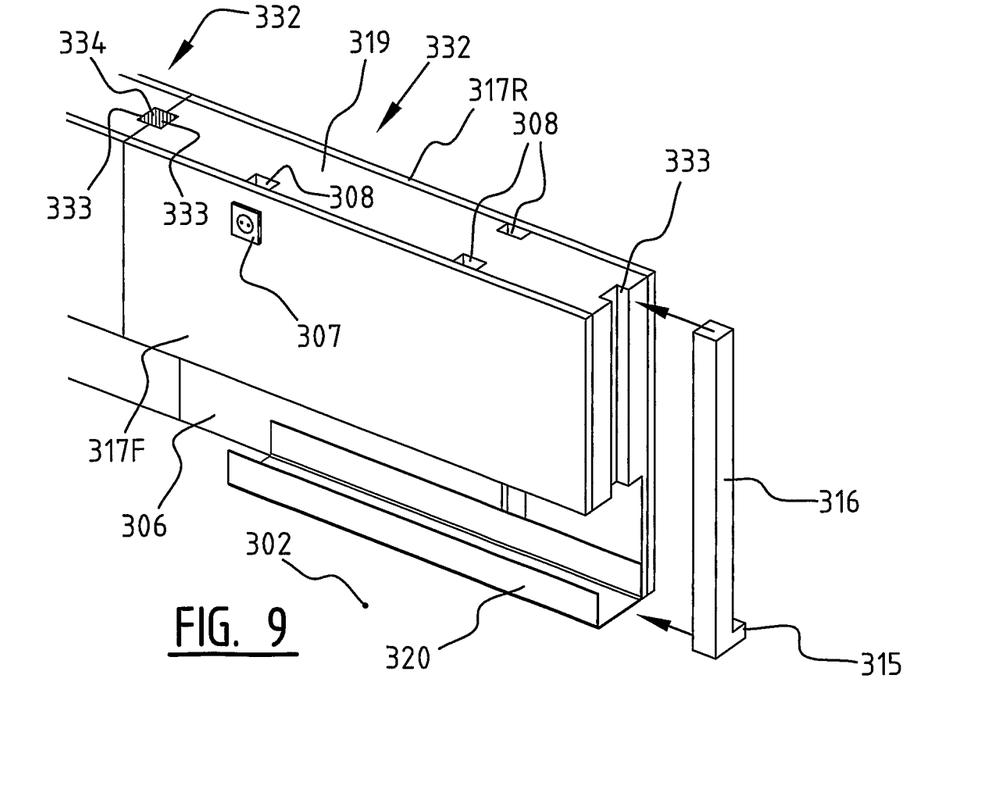
FIG. 9 is a perspective view of a part of a wall consisting of mutually connected panels with a strengthening element to be applied therewith.

When wall 3 is assembled from a number of mutually connected panels 332, the system according to the invention comprises a strengthening element 316 at the position of the connection between two adjacent panels 332 (FIG. 9). In the shown embodiment each panel 332 is constructed from a core 319, a front surface 317F and a rear surface 317R. Formed at regular intervals in core 319 are vertical channels 308 which debouch in recess 306 on the underside of panel 332. These channels or cavities 308 can again serve for passage of cabling from a wall socket 307 to the cabling in recess 306. This recess 306 is formed during the production of panel 332, for instance by cutting away a part of core 319 and adhering a shorter front surface 317F thereto. It is also possible to form recess 306 after assembly of panel 332 by partially cutting away core 319 and front surface 317F.

Panels 332 are each provided on both ends surfaces with a groove 333 so that a space for receiving one or more connecting elements 334 is defined in each case between adjoining panels 332. These connecting elements 334 here take the form of rectangular slats or "tongues" which are fixed in grooves 333, for instance by clamping, glueing or in other manner. In the system according to this variant of the invention use is now made of a strengthening element 316 which protrudes partially into the space defined by grooves 333. This strengthening element 316 once again lies with its underside in the U-profile 320 affixed to floor 302 and is provided in the shown embodiment with a thickened portion 335, whereby the rear upright leg of profile 320 is clamped rigidly between strengthening element 316 and the part of wall panel 332 running through to the floor 302.

Figures 10A, 10B, 10C, 10D:
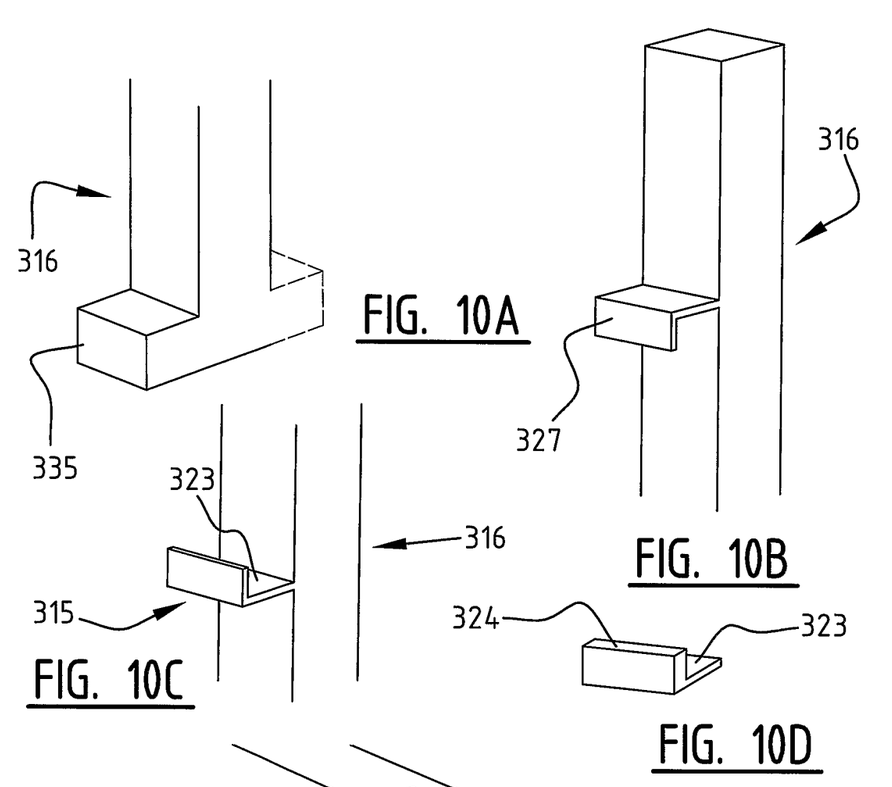
FIGS. 10A to 10D are perspective detail views of alternative embodiments of the strengthening element shown in FIG. 9.

In a variant of this embodiment the lower part of strengthening element 316 can optionally be thickened to the extent that it is accommodated close-fittingly in profile 320 (FIG. 10A). In addition, strengthening element 316 can be provided with a profile 327 integrated therein for the purpose of supporting lower edge 328 of the front surface 317F (FIG. 10B). Support and/or fixation means 315 can once again also be integrated into strengthening element 316, for instance in the form of a hook-shaped protruding profile 323 (FIG. 10C). When the outer end of this hook profile 323 again takes a thickened form, a tongue 324 is created for fixing of a skirting element 314 (FIG. 10D). The different variants of FIG. 10 discussed here can of course be combined with one another.

Figure 11:
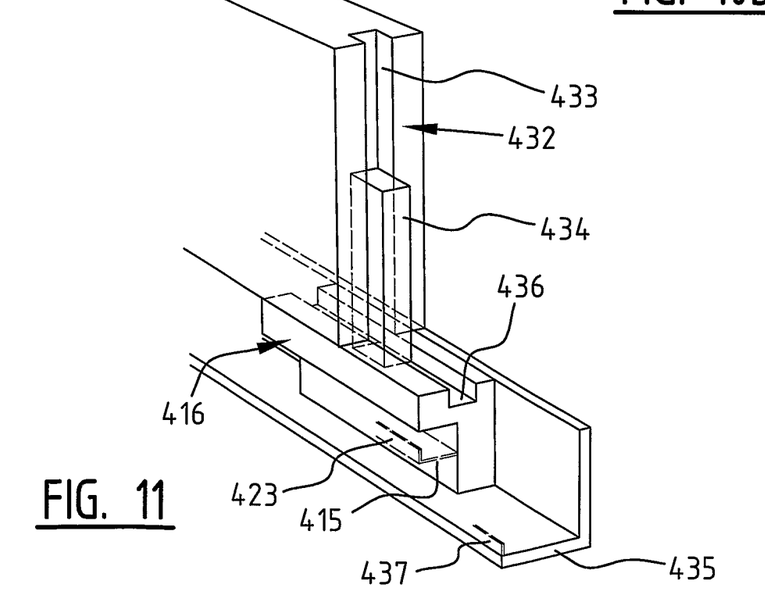
FIG. 11 shows a view corresponding to FIG. 9 of an alternative embodiment of the strengthening element shown therein.

In the case of a wall constructed from panels 432 it is also possible to not have strengthening element 416 protrude into the space defined by grooves 433, but instead to fix the connecting element 434 received in this space to strengthening element 416 (FIG. 11). In this variant no recesses have to be cut in wall panels 432, the recess being defined by an L-profile 435 placed on floor 402 under wall panels 432. This profile 435 is strengthened in each case at the position of a connection between two panels 432 by the presence of the reverse L-shaped strengthening element 416, whereby a C-shaped profile supporting the panels 432 is obtained locally. Strengthening element 416 is provided in its upper surface with a groove 436 in which the protruding connecting element 434 is received. Strengthening element 416 can again be further provided with support and/or fixation means 415 in the form of a hook-shaped profile 423 received in a channel 431. Conversely, the cabling can also be laid on the lying leg of L-profile 435. This lying leg can be further provided with an upright edge 437 which, together with the edge of the lying leg of the reverse L-profile of strengthening element 416, defines a surface against which a skirting element 414 can be fixed.

Figures 12, 13:
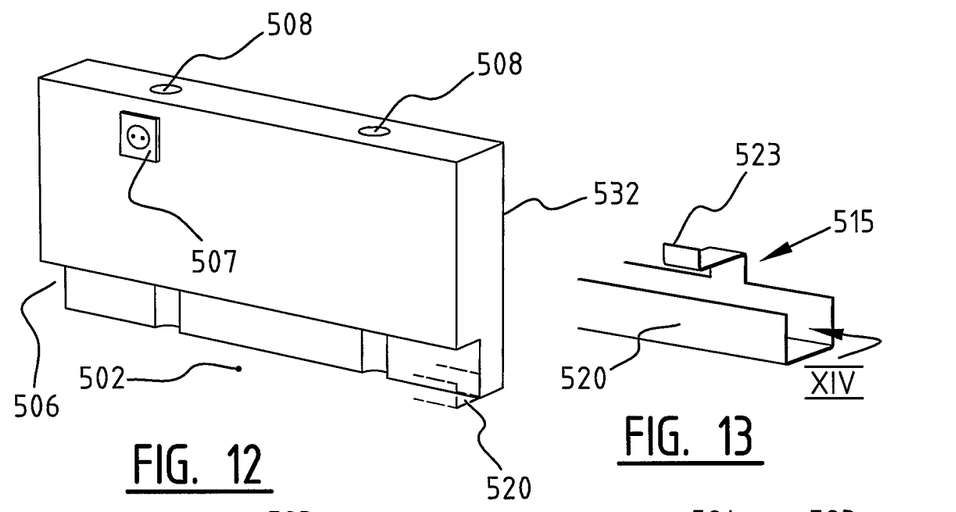
FIG. 12 is a perspective view of a part of a wall consisting of blocks, wherein it is not necessary to apply strengthening elements.
FIG. 13 is a perspective detail view of a mounting profile for the wall of FIG. 12 and support and/or fixation means to be applied therewith.

In yet another variant of the system according to the invention the wall is constructed from blocks 532 manufactured for instance from gas concrete (FIG. 12). On the underside these blocks 532 are again provided with a recess 506 into which two vertical ducts or cavities 508 debouch per block. These ducts 508 are each placed at a quarter of the length of block 532 so that, with the usual offset stacking which characterizes brickwork, they come to lie precisely in one line with ducts 508 in a subsequent row of blocks 532. Cabling can thus once again be trained through these ducts 508 from a wall socket 507 to recess 506. The bottom row of blocks 532 is placed with the inner side of recess 506 along a U-profile 520 affixed to floor 502. Mounted at regular intervals on this continuous profile 520 are hooks 523 which function as support and/or fixation means 515 for the cabling (FIG. 13).

Figure 14A:
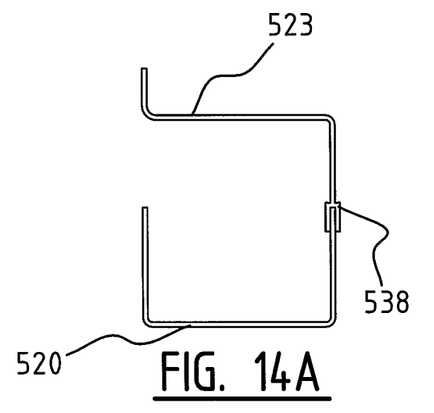
FIGS. 14A to 14D show end views according to arrow XIV in FIG. 13 of alternative embodiments of the support and/or fixation means shown therein.
Figure 14B:
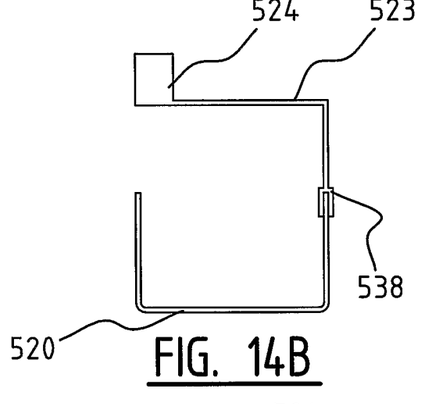
Figure 14C:
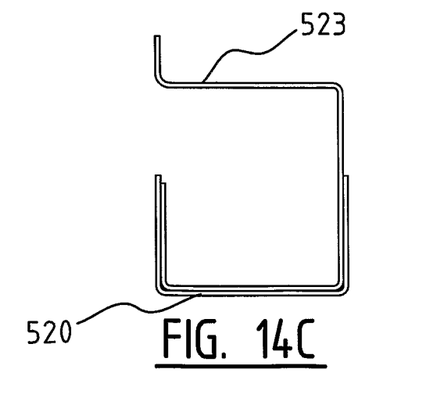
Figure 14D:
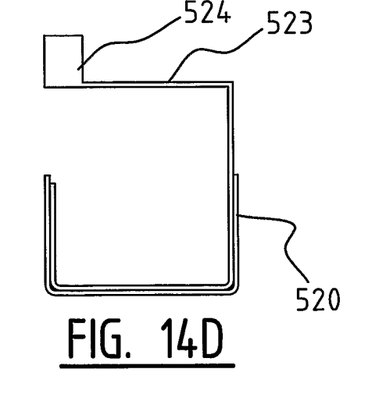

These hooks 523 can have a step-like section and be fixed with a reverse U-shaped lower edge 538 onto the inner upright leg of U-profile 520, for instance by clamping (FIG. 14A). On the other hand, the hooks can also be placed close-fittingly in U-profile 520 (FIG. 14C). When the outer end of each hook profile 523 is given a thickened form, a tongue 524 is once again created for attaching a skirting element (FIGS. 14B, 14D).

Figure 15:
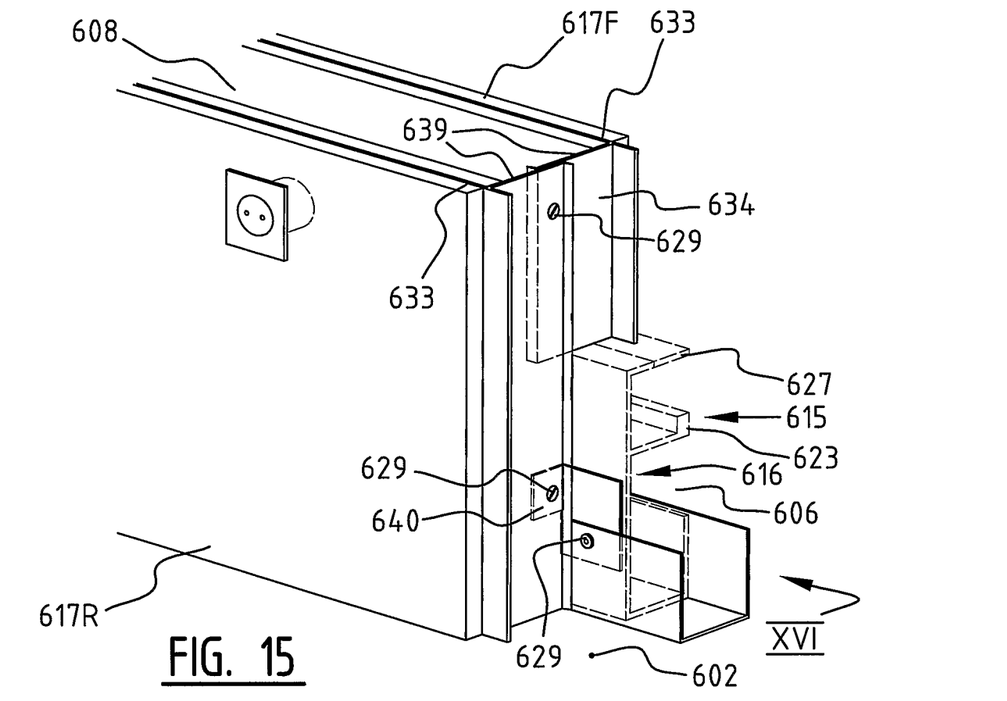
FIG. 15 is a perspective view from a different angle of yet another wall and support and/or fixation means to be applied therewith.
Figure 16:
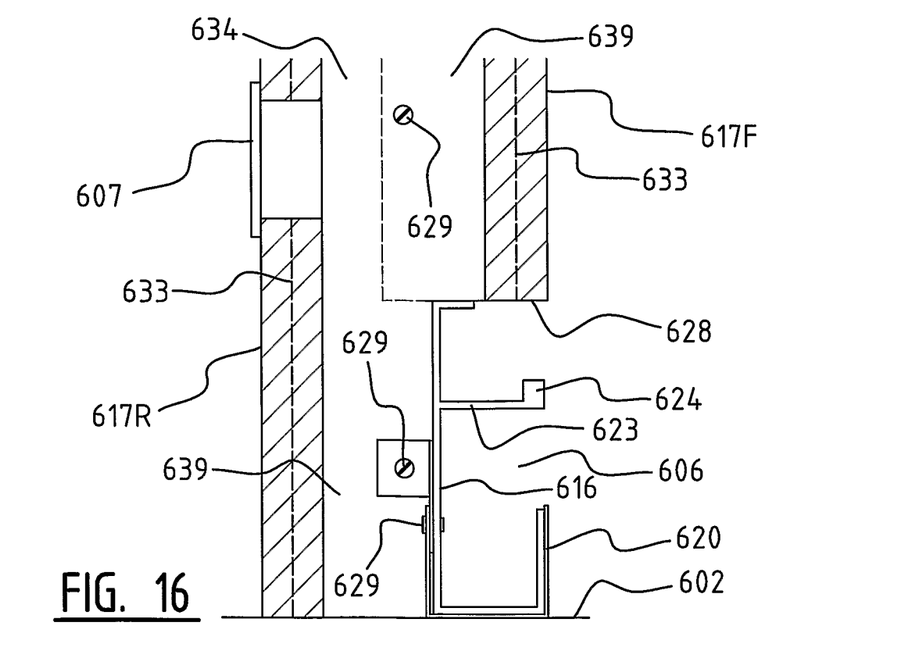
FIG. 16 is an end view according to arrow XVI in FIG. 15, FIGS. 17A and 17B show end views of a height-adjustable skirting element for covering the recess in the wall in two different positions.

It is also possible to envisage the wall being constructed from panels 617F, 617R which are mutually connected by connecting elements 634 of I-shaped cross-section received in grooves 633 in the end surfaces of panels 617F, 617R (FIG. 15). Connecting elements 634 are here then constructed from two T-profiles 639 which face in opposite directions and which are attached to each other by means of for instance screws or pop rivets 629. In this wall the front panel 617F is according to the invention again shorter than rear panel 617R, and the T-profile 639 engaging therein is also shorter than the other, whereby a recess 606 is once again formed (FIG. 16). This recess 606 is also open on its upper side and communicates with hollow space 608 between panels 617F, 617R so that wiring can be guided from a wall socket 607 to the cabling (not shown) in recess 606. The wall is once again placed with the inner side of recess 606 along a U-profile 620 fixed to floor 602. Arranged once again in recess 606 at the position of each connecting element 634 is a strengthening element 616, which is here placed close-fittingly in profile 620. This strengthening element 616 is fixed I means of a tongue 640 and fastening elements 629 to the continuous T-profile 639 and to U-profile 620. Each strengthening element 616, which can comprise an extruded profile, is provided with support and/or fixation means 615 for the cabling, once again in the form of a hook 623. Because hook 623 has a thickened outer end 624, a skirting element can be attached thereto. As indicated with broken lines in FIG. 15, the upper leg of strengthening element 616 can further protrude so far that it forms a support profile 627 for the bottom edge 628 of front surface 617F of the wall.

Figures 17A, 17B:
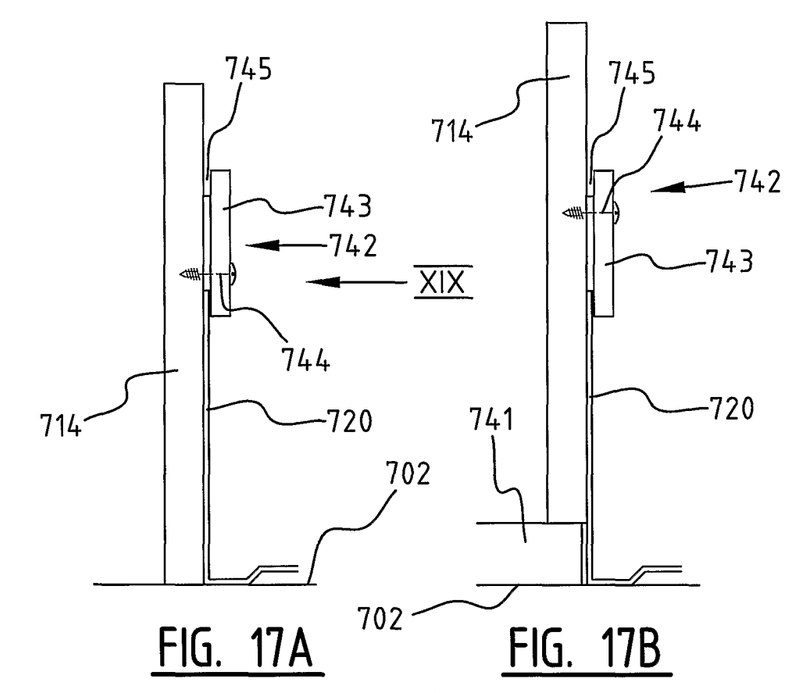
Figure 18:
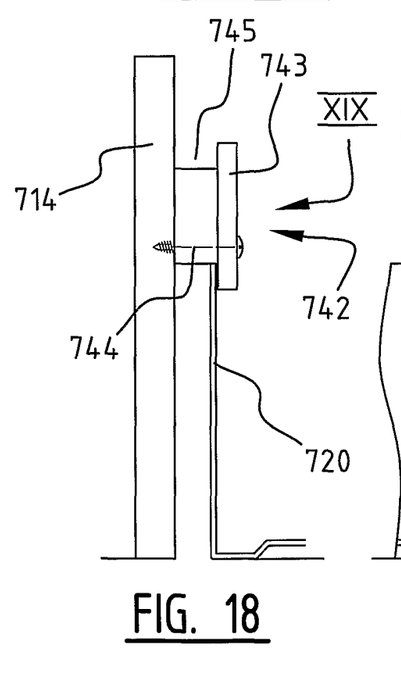
FIG. 18 shows a view corresponding to FIGS. 17A and 17B of an alternative embodiment of the height adjusting means.
Figure 19:
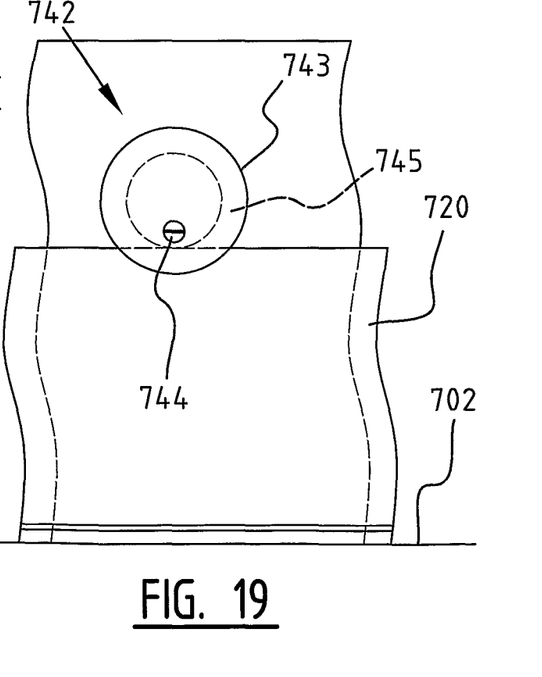
FIG. 19 shows a rear view of the skirting element according to arrow XIX in FIG. 17A and FIG. 18.

In a variant of the system according to the invention skirting elements 714 can be connected height-adjustably to the wall. This is important in order to compensate differences in the level of floor 702, for instance due to whether or not a covering layer 741 is present (FIGS. 17A, 17B). For this purpose the invention provides height adjusting means 742 which in the shown embodiment take the form of a number of engaging elements 743—of which only one is shown here—connected pivotally to each skirting element 714. Each element 743 has a round section and is mounted eccentrically on the skirting element by means of a shaft 744. Each engaging element 743 further has a groove 745 along its periphery into which can engage the upper edge of a U-shaped floor profile 720. When it is desired to keep skirting element 714 clear of U-profile 720, engaging elements 743 of a greater thickness, and so a deeper groove 745, can be applied (FIG. 18). By rotating engaging elements 743 relative to skirting element 714 this latter is moved upward or downward relative to the upper edge of U-profile 720 on which the groove 745 rests.

Figure 22:
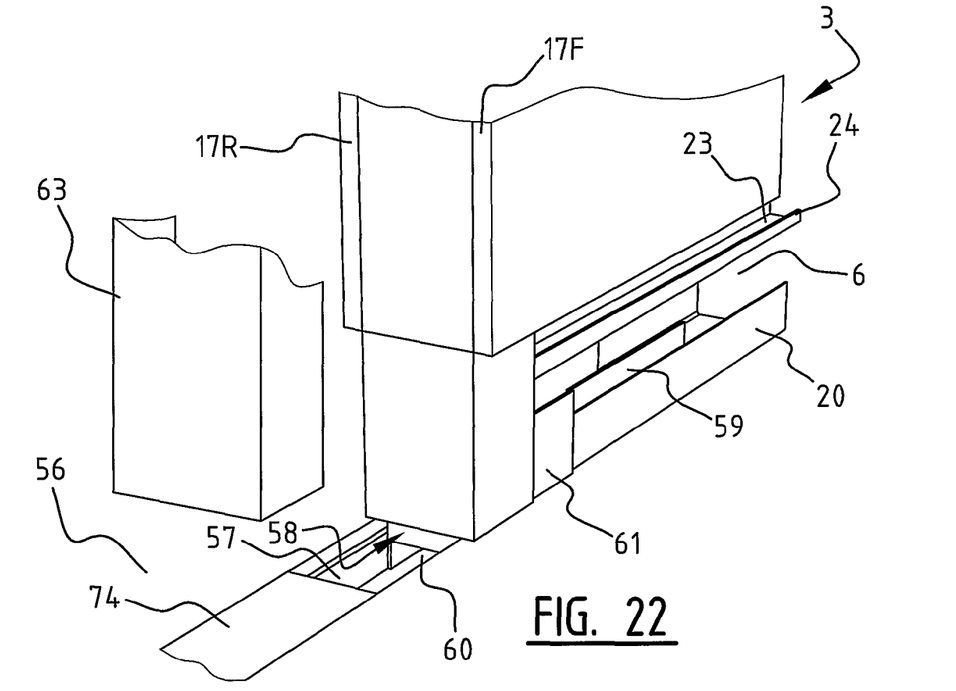
FIG. 22 is a schematic perspective view of a part of a door opening formed in the wall with associated recess in the floor.

When, as in the shown embodiment, a door opening 56 (FIG. 1) is incorporated in partition wall 3, special provisions are necessary to allow cabling 5 to also pass through invisibly here. To this end a recess 57 can be formed in floor 2 of indoor space 1 at the position of door opening 56, this recess being covered with a cover strip or cover plate 74. Recess 57 in floor 2 is connected to recess 6 in partition wall 3. In order to form this connection between recess 6 in wall 3 and recess 57 in floor 2, wherein cabling 5 passes from guiding above the floor to guiding below floor 2, or vice versa, a transition element 58 is arranged therebetween (FIG. 22). This transition element 58 can be assembled from different components of thin sheet material, for instance metal, but in the shown embodiment is manufactured integrally from plastic by injection moulding.

Figure 23:
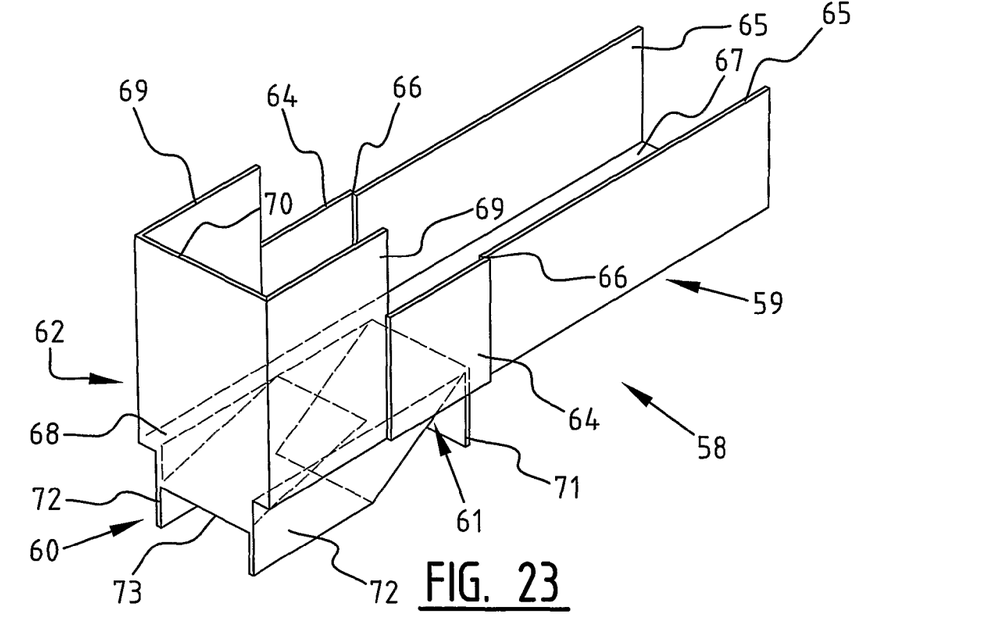
FIG. 23 shows a perspective view of a transition element for use in the door opening.

Transition element 58 here has a first channel part 59 which is open to the top and which is formed by two side walls 65 and a bottom 67 (FIG. 23). The dimensions of this first channel part 59 are chosen such that it can be accommodated close-fittingly in recess 6 in wall 3 and in the U-shaped floor profile 20. In addition, transition element 58 has a second channel part 60 which is open to the bottom and which is formed by two sidewalls 72 and an upper wall 73. The dimensions of this second channel part 60 are chosen such that it fits into recess 57 in floor 2. An inclining transition part 61 is arranged between the two channel parts 59, 60. Transition element 58 further has means 62 for supporting a doorframe 63 bounding opening 56.

At the position of transition part 61 the transition element 58 is provided with side walls 64 which protrude slightly relative to side walls 65 of first channel part 59. Thus formed therebetween is a stop 66 which defines how far transition element of 58 can be pushed into the wall recess 6 and floor profile 20. At the position of this stop 66 the transition element 58 further has a "heel" 71 forming the finishing and boundary of recess 57 in floor 2.

The frame support means 62 are formed by a continuation part 68 of the bottom 67 of first channel part 59 and by three upright walls 69, 70. In the shown embodiment wall 3 is a metal stud wall with studs 18 and front and rear plasterboards 17F, 17R. The end stud 18 which adjoins opening 56 connects here with its underside close-fittingly round walls 69, 70. Doorframe 62 engages in turn around end stud 18 and plasterboards 17F, 17R and is fixed to end stud 18.

In order to stabilize side walls 72 of second channel part 60 on which the frame support means 62 rest, upper wall 73 takes an inclining form. The free height of side walls 72 at the position of frame 63 is hereby limited, while in combination with the inclining transition part 61 an optimum guiding of cabling 5 is moreover achieved at the transition from above to below the floor 2, or vice versa.

It is otherwise also possible to envisage use being made of a floor constructed from so-called matrix tiles as shown in the Netherlands patent application 1033859 of the same applicant, in which channels are already preformed. It is possible in this case for the purpose of leading cabling 5 below door opening 56 to suffice with forming an opening in the bottom of U-profile 20 and in a covering floor arranged on the matrix tiles.

The above described method and the above described system with the different auxiliary means applied therein thus make it possible to arrange cabling invisibly in a room in rapid and simple manner, wherein there is almost complete freedom in respect of the placing of wall sockets or other take-off points on or in the walls of the room.

Although the invention is described above on the basis of a number of embodiments, it will be apparent that it is not limited thereto, and can be varied in many ways within the scope of the following claims.

The invention claimed is:

1. A method for invisibly arranging cabling in an indoor space, comprising:
   replacing or strengthening a stud within at least one partition wall so as to increase the strength of said stud at a position of a recess leaving the recess at least partially clear, said partition wall having a substantially hollow interior, wherein the recess is located on or close to the underside of said partition wall, the recess extends substantially over the whole length of said partition wall, and the recess is at least partially open on its upper side and communicates with the substantially hollow interior;
   placing the cabling laterally into the recess;
   covering the recess after placing of the cabling therein by placing at least one cover in front of the recess and fixing the at least one cover to the strengthening element;
   arranging at least one socket in the partition wall above the recess, such that said at least one socket is in communication with the substantially hollow interior;
   leading a take-off cable from the socket through the substantially hollow interior to the recess; and
   connecting the take-off cable to the cabling in the recess.

2. The method of claim 1, further comprising supporting and/or fixing cabling in the recess at a distance above a floor of the indoor space.

3. The method of claim 2, wherein the cabling is supported and/or fixed at regular intervals in the recess.

4. The method of claim 1, wherein the wall is assembled from studs with paneling on either side between which the substantially hollow interior is formed, and the replacing or strengthening of each stud comprising replacing or strengthening each stud at the position of the recess, with a respective strengthening element.

5. The method of claim 4, wherein the cabling is supported or fixed at one of the respective strengthening elements.

6. The method of claim 1, wherein the wall is constructed from a number of mutually connected panels, and one of the respective strengthening elements is arranged at the position of each connection between adjoining panels.

7. The method of claim 1, wherein the stud is strengthened by providing a strengthening element, which extends substantially over the whole depth of the recess.

8. The method of claim 1, wherein a door opening is incorporated in the partition wall and an additional recess connected to the recess in the wall is formed in the floor of the indoor space at the door opening.

9. A system for invisibly arranging cabling in an indoor space, comprising at least one partition wall, which has a height and a substantially hollow interior, and is provided at or close to its underside with a recess which extends substantially along the whole length thereof and which is at least partially open on its upper side and communicates with the substantially hollow interior, wherein:
   the at least one partition wall comprises a strengthening element that either replaces or reinforces a stud within the at least one partition wall at the position of the recess leaving the recess at least partially clear,
   a cover comprising at least one skirting element arranged in front of the recess,
   the strengthening element has a skirt fixing member for fixing the skirting element,
   at least one socket communicating with the substantially hollow interior is arranged in the partition wall above the recess,
   a take-off cable is connected from the socket through the substantially hollow interior to the recess, and
   the take-off cable is connected to cabling in the recess.

10. The system of claim 9, further comprising at least one support and/or fixation member arranged in the recess at a distance above a floor of the space for the purpose of supporting and/or fixing at least a part of the cabling.

11. The system of claim 10, wherein a plurality of said support and/or fixation members are arranged at regular intervals in the recess.

12. The system of claim 10, wherein the at least one support and/or fixation member is connected to the strengthening element or integrated therein.

13. The system of claim 12, wherein the at least one support and/or fixation member comprise in each case at least one hook protruding from the strengthening element into the recess.

14. The system of claim 9, wherein the strengthening element is provided with a secondary recess.

15. The system of claim 14, wherein the stud has a hollow section and the strengthening element is inserted on the underside into the hollow stud.

16. The system of claim 15, wherein the strengthening element is a profiled plastic part.

17. The system of claim 14, further comprising a plurality of studs and strengthening elements, each having a U-shaped or C-shaped section and are connected to each other in opposing directions, thus forming a closed section in which the secondary recess is formed.

18. The system of claim 9, wherein the wall is constructed from a number of mutually connected panels, and one of the respective strengthening elements is arranged at the position of each connection between adjoining panels.

19. The system of claim 18, wherein the strengthening element is provided with a secondary recess.

20. The system of claim 9, wherein the wall is placed on the floor of the space and one or more profiles are fixed to the floor at the position of the wall, in or against which profiles the underside of the wall is placed and wherein each strengthening element is placed fittingly in the profile and/or connected thereto.

21. The system of claim 9, wherein the strengthening element extends substantially over the whole depth of the recess.

22. The system of claim 9, further comprising at least one height adjusting member for height adjustment of the skirting elements.

23. The system of claim 9, wherein a door opening is incorporated in the partition wall, and an additional recess connected to the recess in the wall is formed in the floor of the space at the position of the door opening.

24. The system of claim 23, wherein a transition element is arranged between the recess in the wall and the recess in the floor.

25. The system of claim 24, wherein the transition element has a first channel part fitting in the recess in the wall and open to the top, a second channel part fitting in the recess in the floor and open to the bottom, and an inclining transition part arranged therebetween.

\* \* \* \* \*